United States Patent
Eubank

(10) Patent No.: US 6,280,493 B1
(45) Date of Patent: Aug. 28, 2001

(54) AIR PRE-CLEANER

(75) Inventor: Gerry E. Eubank, Arlington, TX (US)

(73) Assignee: Dreison International, Inc., Cleveland, OH (US)

( * ) Notice: Subject to any disclaimer, the term of this patent is extended or adjusted under 35 U.S.C. 154(b) by 0 days.

(21) Appl. No.: 09/271,972

(22) Filed: Mar. 19, 1999

(51) Int. Cl.$^7$ .................................................. B01D 45/14
(52) U.S. Cl. ............................... 55/398; 55/401; 55/403; 55/406; 55/456
(58) Field of Search .................................. 55/337, 385.2, 55/459.3, 471, 473, 498, 356, 385.3, 398, 396, 400, 401, 403, 404, 405, 408, 406, 455, 456

(56) References Cited

U.S. PATENT DOCUMENTS

| | | |
|---|---|---|
| Re. 33,085 | 10/1989 | Petersen . |
| 1,165,401 | 12/1915 | Fender . |
| 1,281,238 | 10/1918 | Wegner . |
| 1,319,059 * | 10/1919 | Funk ................................ 55/403 |
| 1,434,562 * | 11/1922 | Quam ................................ 55/403 |
| 1,438,553 * | 12/1922 | Quam ................................ 55/403 |
| 1,530,825 * | 3/1925 | Grimes ............................. 55/403 |
| 1,703,867 * | 3/1929 | Bursley et al. ................... 55/405 |
| 1,931,193 * | 10/1933 | Hawley ............................ 55/400 |
| 3,670,480 | 6/1972 | Petersen . |
| 3,942,499 * | 3/1976 | Kunik et al. ..................... 55/401 |
| 3,973,937 | 8/1976 | Petersen . |
| 4,014,673 * | 3/1977 | Kinnison ......................... 55/396 |
| 4,048,911 | 9/1977 | Petersen . |
| 4,135,897 * | 1/1979 | Gondek ............................ 55/404 |
| 4,173,458 | 11/1979 | Stiles . |
| 4,201,557 | 5/1980 | Petersen . |
| 4,285,707 * | 8/1981 | Pfenninger ....................... 55/396 |
| 4,373,940 | 2/1983 | Peterson . |
| 4,459,141 | 7/1984 | Burrington et al. . |
| 4,547,207 | 10/1985 | Petersen . |
| 5,022,903 * | 6/1991 | Decker .............................. 55/404 |
| 5,059,222 | 10/1991 | Smith . |
| 5,435,817 * | 7/1995 | Davis et al. .................... 55/459.3 |
| 5,449,391 | 9/1995 | Decker . |
| 5,505,756 | 4/1996 | Decker . |
| 5,656,050 | 8/1997 | Moredock . |
| 5,837,020 * | 11/1998 | Cartellone .................... 55/459.3 |
| 5,893,939 * | 4/1999 | Rakocy et al. .................. 55/471 |
| 6,004,365 * | 12/1999 | Fiacco ............................. 55/471 |
| 6,110,246 * | 8/2000 | Eubank ............................ 55/401 |

FOREIGN PATENT DOCUMENTS

| | | |
|---|---|---|
| 537 557 | 11/1931 | (DE) . |
| 2127416 | 10/1972 | (FR) . |
| 4227 | of 1888 | (GB) . |
| 4803058 | 7/1953 | (IT) . |

OTHER PUBLICATIONS

Turbo Precleaners Brochure, Form 3–001–012, Jun. 1986.
Turbo II Pre–Cleaners Brochure, Form 3–001–015, Mar. 1993.

* cited by examiner

Primary Examiner—Duane S. Smith
(74) Attorney, Agent, or Firm—Fay, Sharpe, Fagan, Minnch & McKee, LLP

(57) ABSTRACT

An air pre-cleaner for centrifugally ejecting heavier than air particulates from an air stream for use in an apparatus having an air intake includes a hood having an opening through which air enters the pre-cleaner. A vane assembly includes a centrally positioned dome, a collar encircling the dome, and a plurality of inlet vanes each being connected at an inner end to the dome and at an outer end to the collar. Each inlet vane is angled in relation to the horizontal plane. The vane assembly further includes a horizontal wall extending radially outward from the collar. An impeller assembly is rotatably mounted to the vane assembly. Also provided is a base on which the vane assembly is supported via the horizontal wall. The hood, the vane assembly and the base are secured to each other. Clean air exits the pre-cleaner through a central opening in the base and dirty air exits the pre-cleaner through peripheral openings in the base.

22 Claims, 8 Drawing Sheets

AIR PRE-CLEANER

BACKGROUND OF THE INVENTION

This invention pertains to air pre-cleaners. More particularly, this invention relates to an air pre-cleaner employing an inlet vane assembly and a rotating impeller assembly.

Air pre-cleaners are used for removing particulates from the air prior to introducing the air through an air cleaner or filter, which is connected to a carburetor or air intake structure, of an internal combustion engine. Pre-cleaners are generally located on the open inlet side of the air intake pipes or stacks of an internal combustion engine. The function of the pre-cleaner is to remove as many contaminates from the air as possible before the air flows into an air filter medium upstream from the internal combustion engine.

Air pre-cleaners operate on the principle of centrifugal separation. Outside air, with its entrained contaminates, enters the pre-cleaner from the vacuum created by the engine. The air and contaminates traverse a set of fixed, static vanes which cause the air to circulate at a great speed. Centrifugal force throws the contaminates and moisture towards the outer wall of the pre-cleaner. The contaminates follow the wall until the reach an opening where they are discharged back into the atmosphere or collected. Clean, dry air is then allowed to the enter the filter and subsequently, the internal combustion engine.

As pre-cleaners work on centrifugal separation, greater air flow velocity will result in better separation between the air and the contaminates. The best contaminate separation happens when the engine in running at a high speed (in r.p.m.) thus causing a high velocity for the air which is flowing into the pre-cleaner. As the velocity of air flow decreases, the centrifugal force on the contaminates also decreases reducing the separation efficiency of the pre-cleaner.

Undesirable contaminates in the atmosphere include particulate matter such as dirt, dust, sand, snow and the like. While most engines include air filters which are meant to remove such contaminates from the air that feeds the engine, engine pre-cleaners are also beneficial in order to extend the life of the air filter and extend the engine's life while at the same time improving fuel economy.

Several different designs of air pre-cleaners are commercially available in the marketplace. In one design, an air pre-cleaner uses a rotatable impeller or spinner to separate particles from air, discharge the dirty air and particle mixture circumferentially from a housing and direct the clean air to the air intake structure of an engine. The clean air moves centrally through a stack to the engine in response to a vacuum pressure on the air moving towards the engine. This air pre-cleaner has an air inlet vane assembly located in the bottom of the housing. The air flows upwardly in a circular path into a centrifugal separation chamber and then turns downwardly into the centrally located clean air exit opening. This impeller is used to pump air and articulate matter out through side discharge openings. This type of air pre-cleaner, however, does not urge the air flowing over the vanes of the pre-cleaner toward the outer walls of the separation chamber in order to enhance particle separation from the air.

Known air pre-cleaners have also included a design in which air flows into the top of the air pre-cleaner and flows axially downwardly through the pre-cleaner and into the intake stack of the engine. Although such pre-cleaners may perform adequately with respect to particulate material, this accomplished sometimes at the expense of reduced air flow. In other words, the pre-cleaner itself may become an air restriction. The known pre-cleaners of this type do not use static vanes which cause the air to circulate at as a great a velocity as such vanes could. Also, some pre-cleaners are only useable when positioned in one orientation, i.e., positioned on a vertical axis or positioned on a horizontal axis. Moreover, the known pre-cleaners do not have an optimized impeller construction. Also, they do not have stator vanes in the clean air exhaust passage of the pre-cleaner.

Accordingly, it has been considered desirable to develop a new and improved air-pre-cleaner which would overcome the foregoing difficulties and others while providing better and more advantageous overall results.

BRIEF SUMMARY OF THE INVENTION

An air pre-cleaner for centrifugally ejecting heavier than air particulates from an air stream for use in an apparatus having an air intake is provided.

More particularly, the air pre-cleaner comprises a hood having an opening in which air enters the pre-cleaner and a vane assembly including a centrally positioned dome, a collar encircling the dome and a plurality of vanes, each vane being connected at an inner end to the dome and at an outer end to the collar. Each vane is angled in relation to a horizontal plane. The vanes are inclined slightly away from the direction of air movement in the plane perpendicular to forward motion of the entering air. An impeller assembly in rotatably mounted to the vane assembly. Also provided is a base to which the vane assembly and the hood are secured. The base includes a clean air exit port.

In accordance with another aspect of the present invention, an apparatus is provided for separating particles from a gas carrying the particles.

More particularly in accordance with this aspect of the invention, the apparatus comprises a housing including a separation chamber, the housing having an inside wall surface surrounding the chamber. The housing comprises an inlet opening through which air enters the pre-cleaner and a vane assembly including a centrally positioned dome, a collar encircling the dome and a plurality of vanes, each connected at a radially inner edge to the dome and at a radially outer edge to the collar. An impeller assembly is rotatably mounted in the separation chamber. The impeller assembly includes at least one vane. Said at least one vane includes a first section positioned in a first plane and a second section which is mounted at an obtuse angle in relation to the first section.

Once advantage of the present invention is the provision of a new and improved air pre-cleaner.

Another advantage of the present invention is the provision of an air pre-cleaner having a vane assembly which includes a set of static vanes having a fully concave surface along which inlet air flows causing the air to rotate at a great centrifugal speed in relation to forward motion. In one embodiment, the vane pitch is twisted to keep the chord width relatively constant over the full vane length. This causes an essentially constant velocity over the entire vane surface. In another embodiment, the vane chord is slightly wider at the inner diameter than at the outer diameter.

Still another advantage of the present invention is the provision of an air pre-cleaner having a vane assembly in which the vanes are inclined slightly away from the direction of air movement in the plane perpendicular to forward motion of the entering air. For best particle separation, it has been found that air must be forced toward the outer walls of the separation chamber.

Yet another advantage of the present invention is the provision of an air pre-cleaner having an impeller with a shape that will not unload with increasing static pressure. To this end, the outer blade of the impeller has a compound shape. The shape is such that neither of the two impeller blade surfaces will unload or cavitate at increasing static pressures.

Still yet another advantage of the present invention is the provision of an air pre-cleaner having an impeller which makes less noise when spinning than do conventional impeller designs.

Yet still another advantage of the present invention is the provision of an air pre-cleaner which includes a impeller with ejection blades that cooperate with stator vanes in the housing of the air pre-cleaner to provide much higher ejection pressures than can be obtained with the known designs. The design provides more air flow for a given size pre-cleaner than is true of the known air pre-cleaner designs.

An additional advantage of the present invention is the provision of stator vanes positioned around the perimeter of an outlet tube of an air pre-cleaner. The stator vanes cooperate with inner blades of an impeller assembly to help keep the rotational energy of the air in contact with the impeller blades.

A further advantage of the present invention is the provision of an air pre-cleaner which is made out of suitable conventional thermoplastic materials in a simple manner. To this end, the inlet cover is so shaped and sized that it can be readily injection molded using only two mold parts for reduced cost.

A still further advantage of the present invention is a provision of an air pre-cleaner having a hood with a grill surface which is resistant to clogging by debris and which resists the ingress of rain.

A yet further advantage of the present invention is the provision of an air pre-cleaner which is capable of particle extraction by both low pressure area and centrifugal force as well as by mechanical separation.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts preferred embodiments of which will be described in detail in this specification and illustrated in the accompanying drawings which form a part hereof wherein.

DETAILED DESCRIPTION OF THE PREFERRED EMBODIMENTS

Figure 1A:
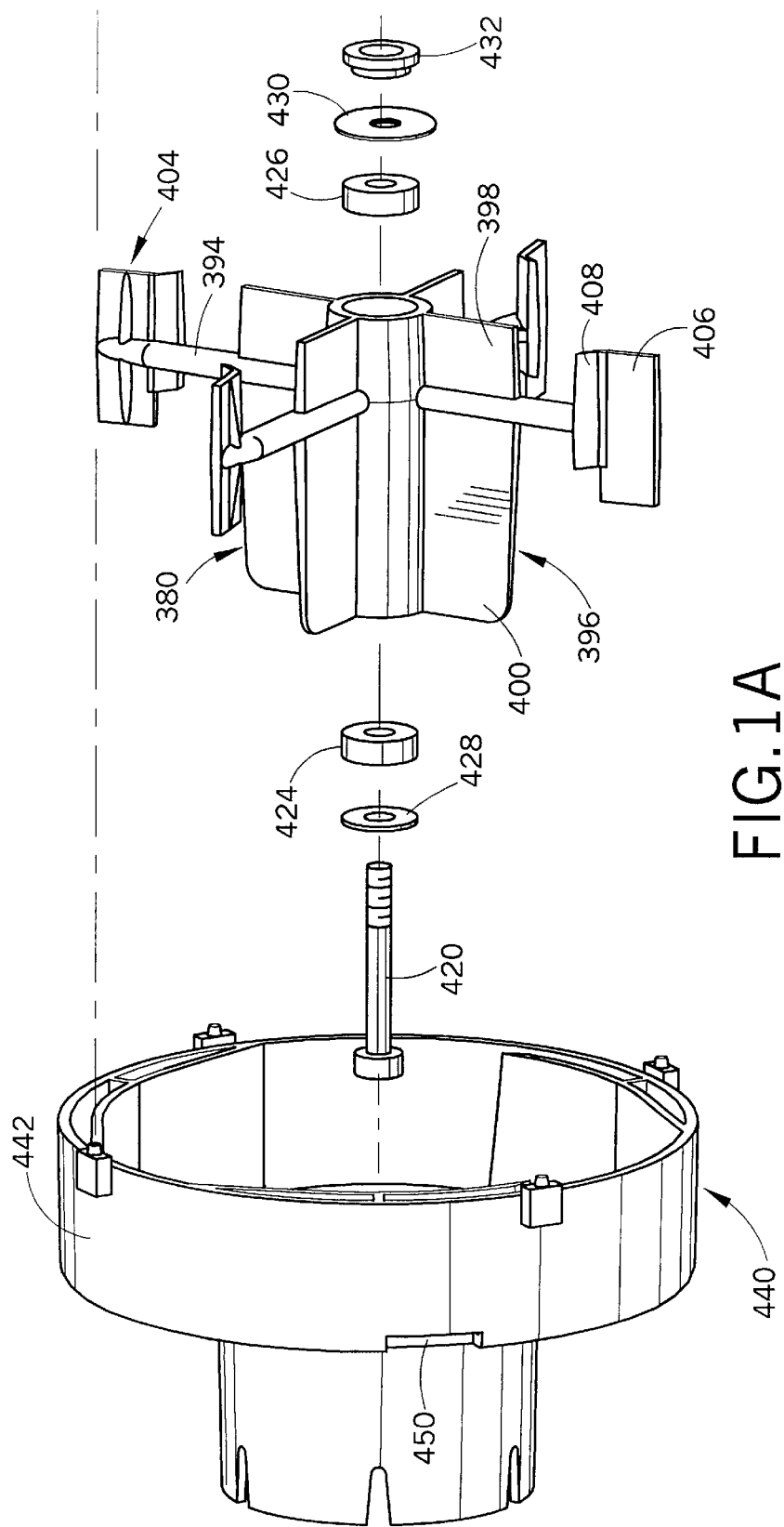
FIGS. 1A and 1B together are an exploded perspective view of an air pre-cleaner according a first preferred embodiment of the present invention.
Figure 1B:
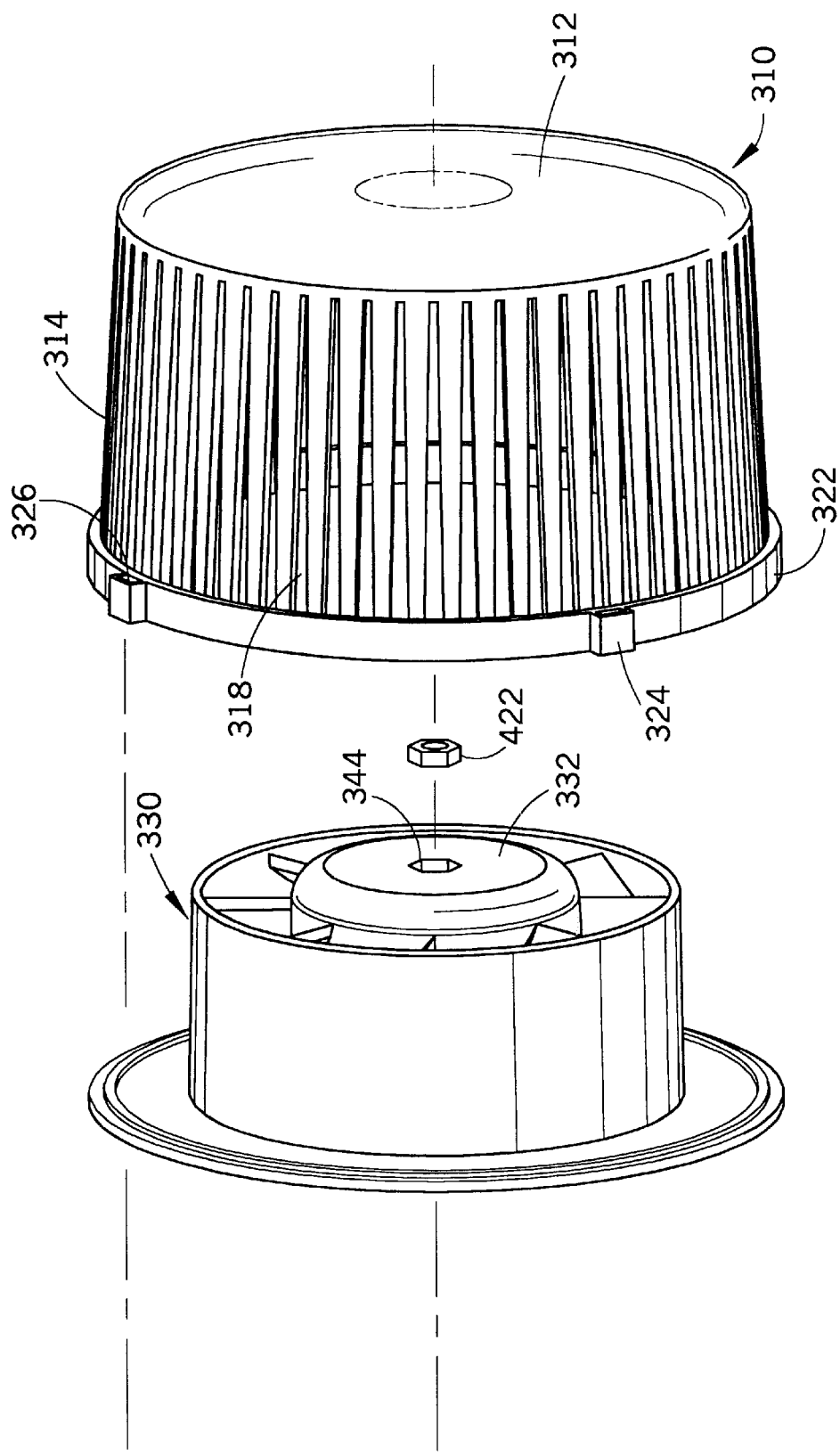

Referring now to the drawings wherein the showings are for purposes of illustrating preferred embodiments of the invention only and not for purposes of limiting same, FIGS. 1A and 1B together show an exploded perspective view of an air pre-cleaner according to a first preferred embodiment of the present invention.

Figure 3:
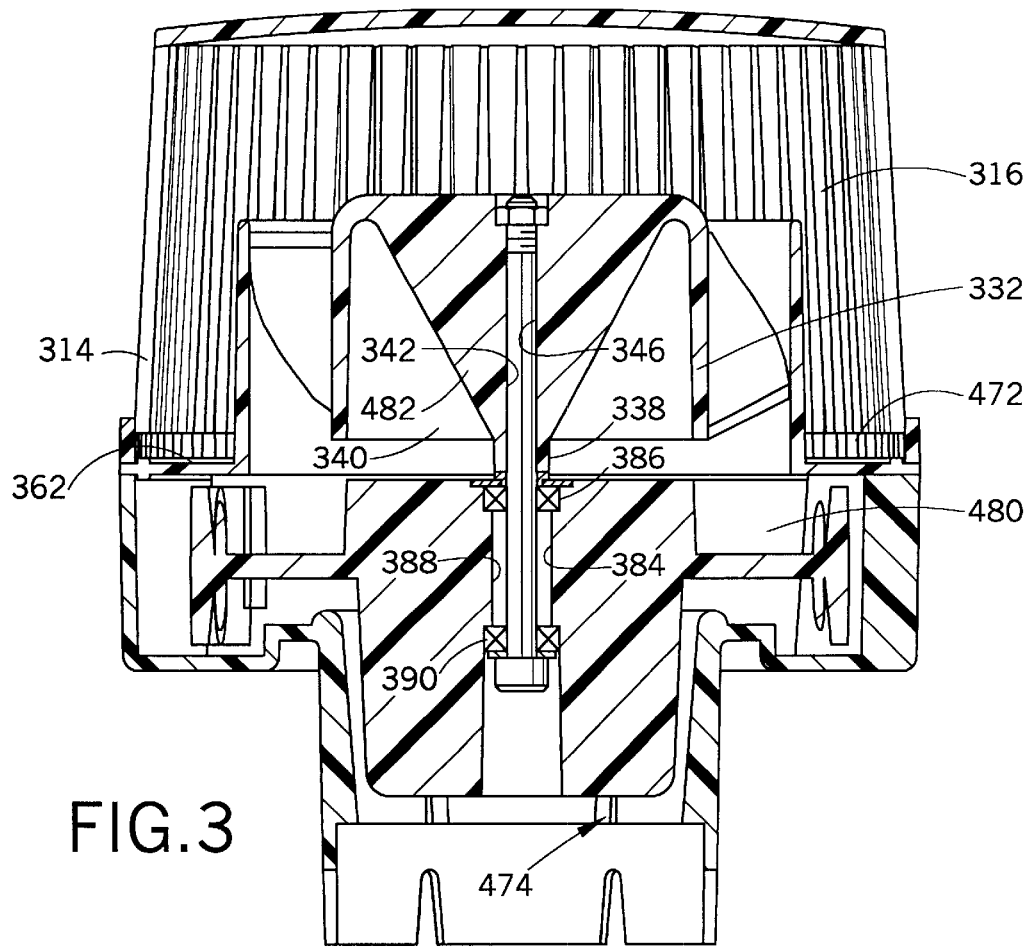
FIG. 3 is a reduced cross-sectional view of the air pre-cleaner of FIG. 2 along the line 3—3.

The air pre-cleaner comprises a hood 310 having an end wall 312 and a skirt 314 depending therefrom. The end wall and the skirt together form a first chamber 316 (FIG. 3). A plurality of spaced, aligned, openings 318 are provided on the skirt 314. The openings 318 communicate with the first chamber 316. Located on a collar 322 encircling a distal end of the skirt 314 are a plurality of spaced tabs 324. The tabs protrude from the collar. Each tab has an opening 326 extending therethrough. The hood 310 has a slight taper from the end wall 312 to a distal end of the skirt 314. This construction, in conjunction with the vertical openings or slots 318 allows for easily moldability of the hood.

Figure 5:
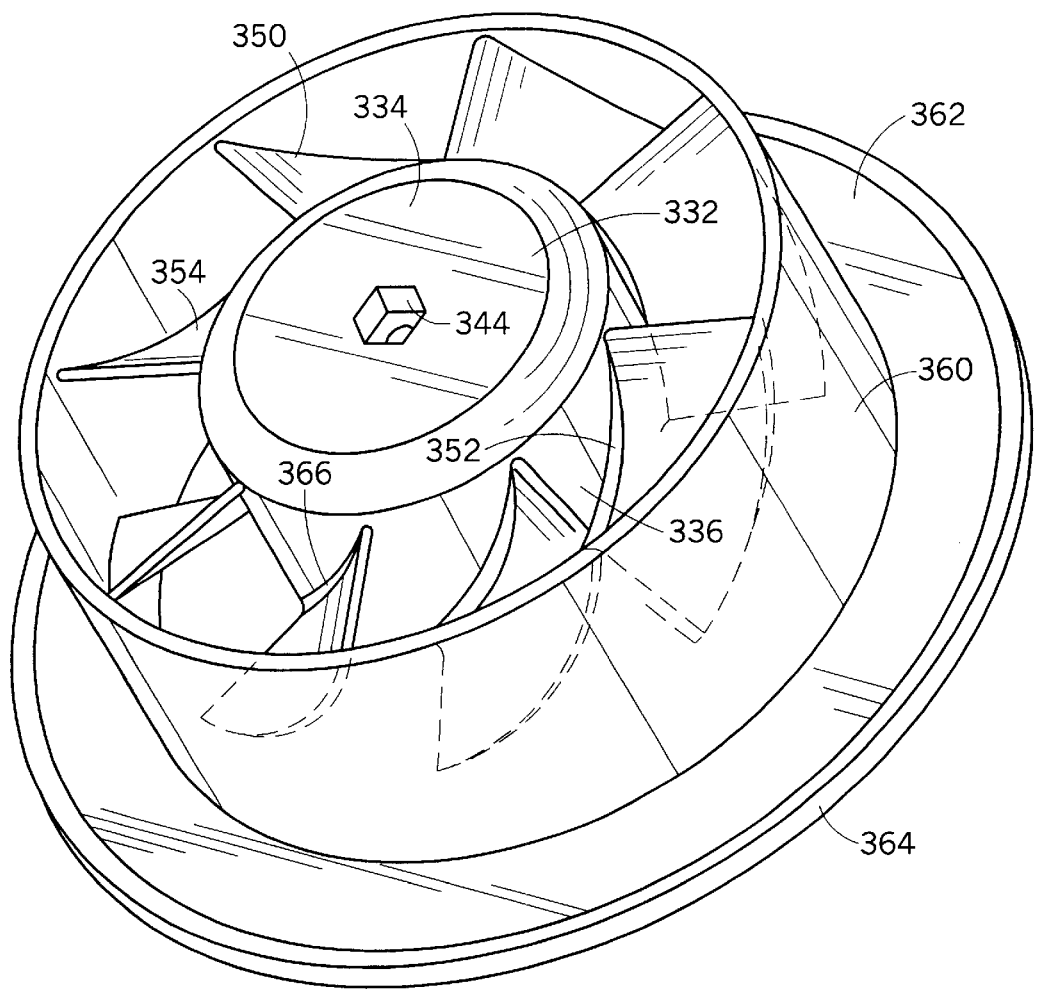
FIG. 5 is an enlarged perspective view of a vane assembly of the air pre-cleaner of FIG. 1.

Positioned beneath the hood 310 is a vane assembly 330. With reference now also to FIG. 5, the vane assembly comprises a centrally located dome 332 including a top wall 334 and a peripheral skirt 336. With reference now also to FIG. 3, a stem 338 extends axially from the top wall 334 parallel to the skirt 336. The skirt 336 and the stem 338 define between them an annular chamber 340. An opening 342 extends through the stem 338. The opening comprises an enlarged diameter upper hexagonally shaped socket section 344 as is best illustrated in FIG. 1B and a reduced diameter circular section 346.

With reference now also to FIG. 5, a plurality of inlet vanes 350 each have a radially inner end 352 secured to the skirt 336 of the dome 332 and a radially outer end 354 secured to a collar 360 encircling the dome. Extending radially outwardly from the collar 360 at a bottom edge thereof is a ledge or horizontal wall 362. An annular rib 364 is defined adjacent the radially outer periphery of the horizontal wall 362.

In one embodiment, the depth of each vane 350 is on the order of approximately one inch (2.54 cm.). However, the vane depth could be greater on larger models of the air pre-cleaner. The pitch of each vane 350 is twisted to keep the chord width relatively constant over the full vane length. This provides a constant length flow path and essentially a constant velocity over the entire vane surface. The object is to force the air flow around the outer perimeter at lower flow rates providing maximum centrifugal force for the spin diameter and forward expansion volume which are available in the air pre-cleaner. An alternate construction would be to have the vane chord slightly wider at the inner diameter than at the outer diameter. The vanes 350 are inclined slightly away from the direction of air movement in a plane perpendicular to forward motion of the entering air. For example, if the entering air is forced to flow clockwise, then the inlet vanes 350 will terminate slightly counter clockwise at the outer diameter in relation to the inner diameter. To this end, it can be seen that a somewhat triangular portion 366 of each vane, which is located immediately adjacent the dome 332. The portion 366 is wider at its bottom end than at its top end and is canted in relation to a plane of the vane 350. During the course of development of the instant air pre-cleaner, it has been found that for best particle separation, the air must be forced toward the outer walls of the separation chamber.

Figure 6:
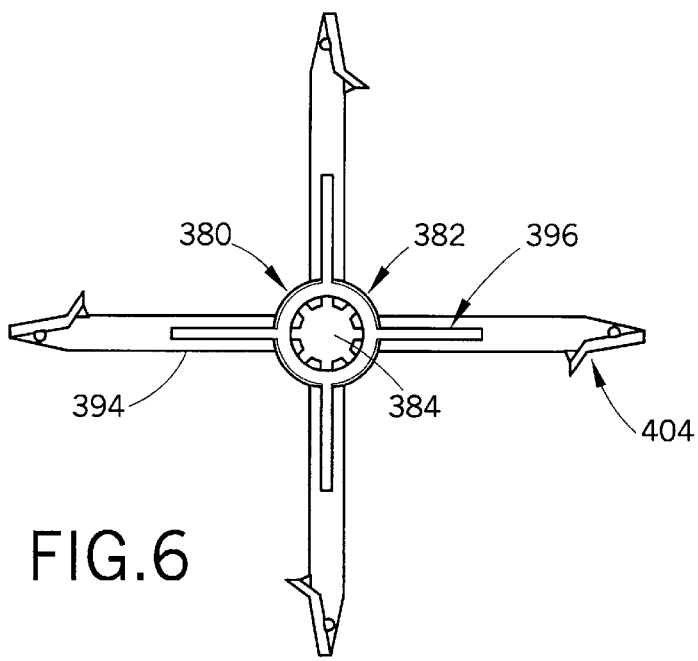
FIG. 6 is a top plan view of an impeller of the air pre-cleaner of FIG. 1.

Referring again to FIG. 1 positioned adjacent the vane assembly 330 is a rotating impeller assembly 380. With reference now also to FIG. 6, the rotating impeller assembly comprises a hub 382 having a bore 384 extending axially therethrough. As best shown in FIG. 3, the bore includes a first section 386 of a first diameter, a second section 388 of a second and smaller diameter, and a third section 390 of a third diameter. Preferably, the first and third sections 386 and 390 of the bore 384 have the same diameter. Preferably, four arms 394 radiate away from the hub 382. Of course, more or less than four arms could be employed for the rotating impeller assembly. This would depend to some extent on the size of the air pre-cleaner Secured to the hub are plurality of first blades 396, each of which is aligned with a respective one of the arms 394. As best shown in FIG. 1A, the first blades are thus located at the proximal ends of the several arms. Each first blade 396 includes a first section 398 which is positioned above its respective arm and a second section 400 which is positioned below its respective arm.

Located at the distal ends of each of the arms 394 is a respective second blade 404. Each second blade is of compound shape. Each second blade 404 includes a first section 406 which is substantially aligned with its respective arm 394 and a second section 408 which is oriented at an angle to the first section 406. The ejection blades of the impeller are large in relation to other designs on the market. They are of a shape that will not unload with increasing static pressure. In one embodiment, each first section 406 has approximately a 0.5 inch (1.27 cm.) width inclined away from the direction of rotation by 10 degrees over a 1.3 inch (3.3 cm.) length. The second section 408 is approximately 0.25 inches (0.64 cm.) in width and is inclined away from the direction or rotation at about approximately 45 degrees. The relationship of the sizeable first blades 396 and the compound second blades 404 combine to provide a blade assembly which will not unload or cavitate at increasing static pressures. These blades combine to convert the rotational velocity of the impeller to static pressure at the ejection ports better than straight, forward or backward curved blades.

The unique shape of the second blades 404 combined with the fact that these blades are enclosed on the top and bottom and masked from the rotating air which leaves the inlet vanes 350—and because the blades are rotating in the perimeter of the air leaving the inlet vanes—provides for particle extraction by both low pressure and centrifugal force as well as by mechanical separation.

Also provided is a fastening means for securing the rotating impeller assembly 380 to the vane assembly 330. The fastening means comprises a bolt 420 and a lock nut 422. The lock nut is generally hexagonally shaped and is positioned in the hexagonally shaped socket section 344. The bolt extends through the hub 382 to the bottom end of the rotating impeller assembly 380. A pair of bearings 424 and 426 are positioned in the respective first and third sections 386 and 390 of the hub bore 384. The bearings 424 and 426 enable the rotating impeller assembly to smoothly rotate in relation to the vane assembly 430. A washer 428 is positioned between a head of the bolt and the lower bearing 424. Also provided is a large size conventional washer 430 and a step washer 432 adjacent the upper bearing 426. The step washer is illustrated with the smaller diameter end of the washer resting on the washer 430. Alternatively, two washers of different diameters can be stacked.

Figure 7:
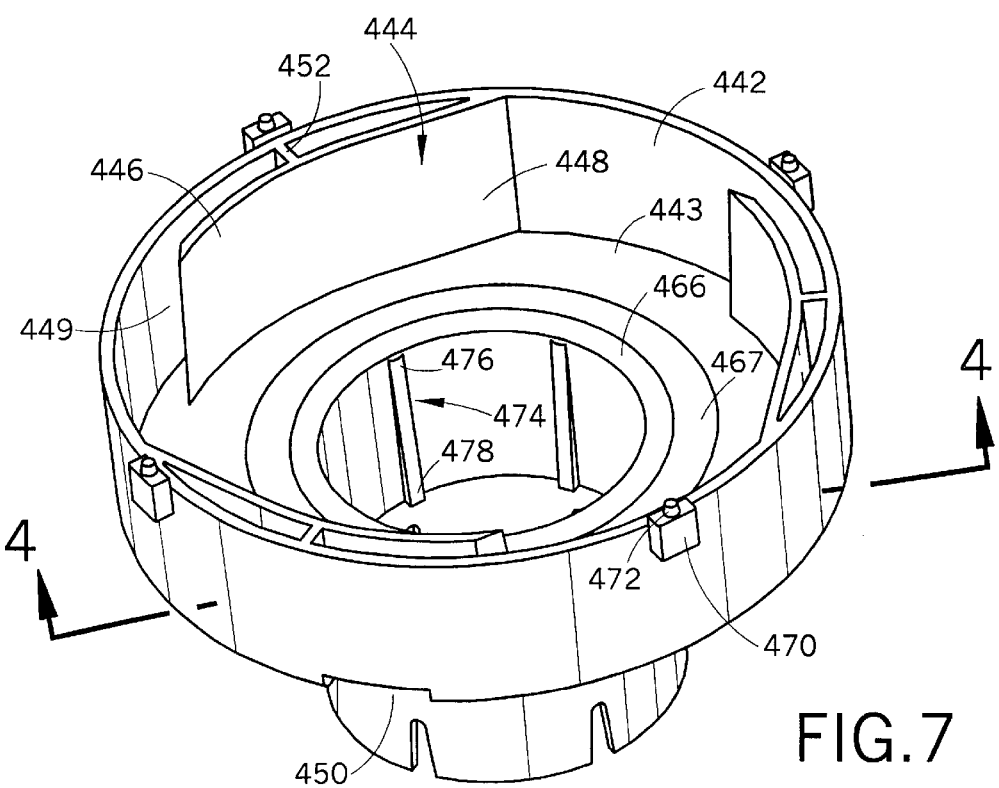
FIG. 7 is a perspective view of the base portion of the air pre-cleaner of FIG. 1.

The air pre-cleaner further comprises a base 440. With reference now to FIG. 7, the base 440 includes an side wall 442 and a base wall 443. Also provided is at least one inwardly curved cut off wall 444. The cut off wall 444 includes a first section 446, which is substantially parallel to the side wall 442 and a second section 448 which merges into the side wall. Defined between the first stator vane section 446 and the side wall 442 is an opening 449 which leads to an exhaust port 450. The exhaust port is defined at the junction of the base wall 443 with the side wall 442. A barrier wall 452 extends from the cut off wall 444 to the side wall 442 separating the first and second sections 446 and 448 of the cut off wall. The barrier wall 452 serves to stiffen the cut off wall 444 in relation to the side wall 442 of the base 440. Preferably, three such cut off walls are located on the base 440 in a substantially equally spaced manner. Also, three separate exhaust ports 450 are provided on the base. The cut off walls serve to shear the air being spun around by the second blades 404 to force it out the outlet ports 450.

Figure 4:
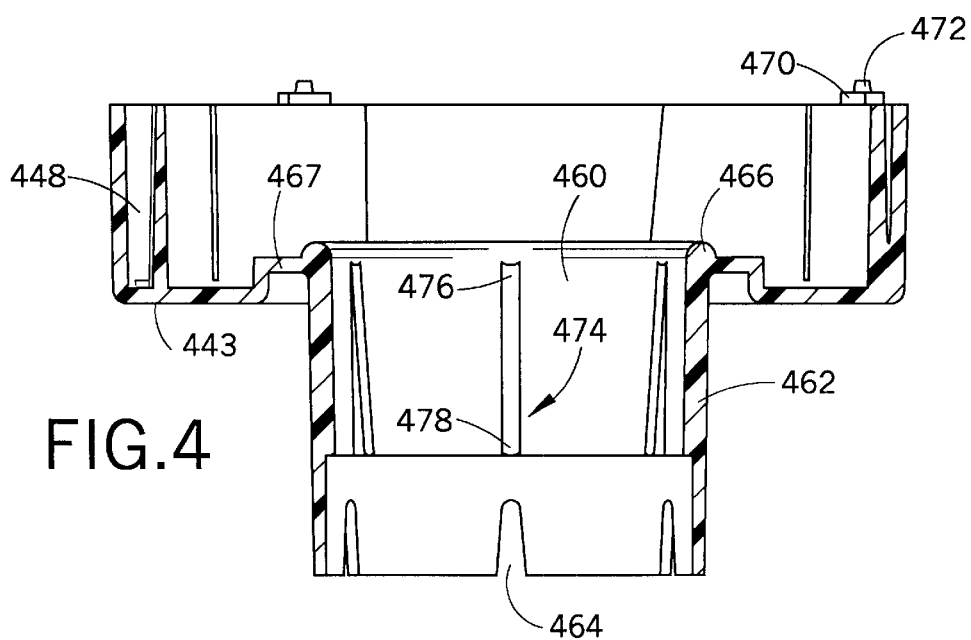
FIG. 4 is a cross-sectional view of a base of the air pre-cleaner of FIG. 7 along the line 4—4.

With reference now also to FIG. 4, a clean air exit opening or port 460 is centrally located on the base wall 443 and is encircled by a sleeve 462 depending from an outer side of the base wall. The sleeve 462 is of smaller diameter than is the side wall 442. Defined in the sleeve 462 are a plurality of spaced slots 464. These slots are conventional and enable the base to be compressed or expanded when mounted on an intake stack of a conventional internal combustion engine by means of a conventional encircling clamp (not illustrated).

Figure 2:
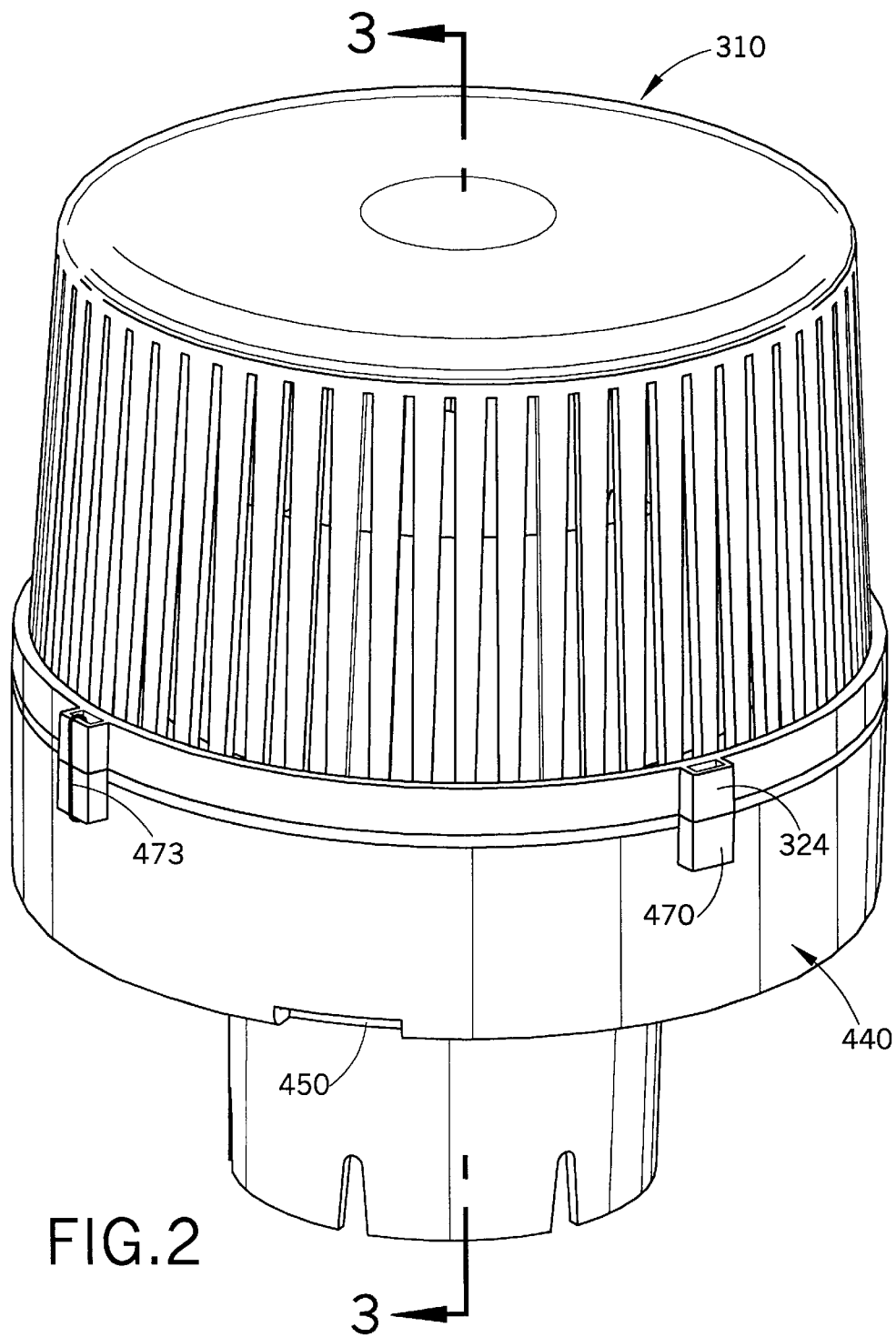
FIG. 2 is a perspective view of the air pre-cleaner of FIG. 1 in an assembled condition.

A ring shaped rib 466 is positioned on an annular step 467 at the inner periphery of the base wall 443 and encircles the clean air exit opening 460. The smooth curved shape of the rib facilitates a laminar air flow for the exiting air. Extending radially outwardly from the side wall 442 are a plurality of spaced protrusions 470. Each of the protrusions has an upwardly extending tab 472. Preferably four such protrusions are provided. These protrusions are aligned with the protrusions 324 on the hood 310. The tabs 472 extend through the slots 364 in the vane assembly 330 and into the openings 326 in order to secure the hood 310 to the base 440. As shown in FIG. 2, a clip 473 is fastened over the cooperating protrusions 470 and 324.

Spaced around the inner periphery of the sleeve 462 are a set of stator vanes 474. Each of these vanes has a first end 476 which tapers toward the sleeve 462 and a second end 478 which extends inwardly away from the sleeve 462. The stator vanes 474 cooperate with the inner blades 396 of the impeller assembly 380 and provide an area of laminar flow. The stator vanes are useful in that they help to keep the rotational energy of the air in contact with the impeller assembly, thereby urging the impeller to spin more vigorously. Thus the stator vanes 474 prevent the loss of rotational energy while allowing straightened flow through a boundary region. Moreover, the stator vanes serve a structural purpose. The second ends 478 thereof act as a secondary stop when the air pre-cleaner is positioned on a tube or adapter leading to the intake of an internal combustion engine. Thus, the stator vanes in cooperation with the impeller assembly allow more air flow and better ejection of particulates at all flow rates.

Combined with the exhaust ports 450 which are of a somewhat restricted area, a much higher ejection pressure is attained than is available on conventional air pre-cleaners. The higher ejection pressure is considered important in the use of the air pre-cleaner of the present invention in an inline configuration as sufficient exhaust pressure must be generated to offset the restriction of the inlet ducting by the air pre-cleaner itself. Also, by removing as much of the rotational energy from the air as possible, and by increasing the resistance of the drive impeller air flow through the air pre-cleaner is increased.

With the air pre-cleaner illustrated herein, atmospheric air flows horizontally through the openings 318 in the hood 310 and into the first chamber 316. In the first chamber, the air flows upwardly over the collar 360 and then downwardly around the dome 332 and across the vanes 350. As is best illustrated in FIG. 5, due to the smooth curved shape of the vanes 350, the air acquires a strong swirling motion as it flows into a second chamber 480 (FIG. 3) defined between the vane assembly 330 and the base 440. The inlet vanes 350 are fully concave to inlet air flow resulting in maximum spin for any given forward motion.

The swirling nature of the air flow impels heavier than air dirt particles and moisture radially outward in the second chamber 480. The swirling nature of the air flow propels the blades 396 and 404 to begin rotation of the rotating impeller assembly 380 thereby increasing the rotational vortex and further propelling particles in the air stream radially outward.

In the meanwhile, clean air flows radially inward toward the clean air exit port 460. The clean air flows out the exit port 460 through the sleeve 462 and into the intake of the adjacent internal combustion engine.

It should be apparent that the dome 334 blocks direct access of the inlet air to the clean air exit port 460. As best shown in FIG. 3, the skirt 314 of the dome extends slightly below the inlet air vanes 350 thereby further restricting direct access of the inlet air to the clean air exit port. It should also be apparent from FIG. 3 that the annular chamber 340 is open to the second chamber 480 and provides additional area for the spinning air to enter the clean air exit ports 450.

The relatively large ledge or horizontal wall 362 is advantageous because it accommodates the partially shrouded ejection impeller (i.e. the second blades 404) and eliminates the need for an overhang of the rain hat top or hood 310 while allowing the hood to taper slightly from top to bottom.

The upper portion or first section 398 of the first blade 396 functions as a drive impeller creating a pressure under the dome 332 less than at the outlet ports 350. The impeller portion adjacent the dome is wider than the open area of the dome and in close proximity to the surface thereof. This prevents air movement into the low pressure area 340 beneath the dome 332 improving both particle separation and the utilization of rotational energy.

Any dirt, particles or moisture which enter the openings 318 and flow across the vanes 350, even if they were to reach the base wall 443 would be prevented from entering the clean air exit port opening 460 due to the presence of the ring-shaped rib 466 and the step 467. Rather, due to the urging of the spinning air, the dirt will be swept up by the outer blades 404. This dirt will exit through the dirty air exit channels 448 and the outlet ports 450 thereof.

The location of the collar 360 is such as to partially mask the second blades 404 providing higher vane speed for better ejection. The reduced diameter of the vane assembly, i.e. of the collar 360 and the vanes 350 allows the hood 310 to be of a larger diameter than the vane assembly and still seat on the base 440. This provides a shorter assembly height than the known air pre-cleaners of this type.

With reference again to FIG. 3, dirt particles are prevented from becoming trapped in an area 472 defined between the outer wall of the collar 360 and an inner wall of the skirt 314 because inrushing air will sweep the particles up. The inlet air will push the dirt either back into the atmosphere or into the air pre-cleaner.

It is noted that the openings 316 are so shaped that they are wider on the bottom than on the top. Thus, more air flows in at the bottom end of each opening than at the top end thereof.

In the preferred embodiment of the present invention, the hood 310, the vane assembly 330, the rotating impeller assembly 380 and the base 440 are all made of a suitable conventional thermoplastic material such as by injection molding. In one embodiment, the thermoplastic material is a conventional glass filled nylon. In another embodiment, the thermoplastic is a conventional ABS. Of course, it should be recognized that one or more of these components could also be made from any other conventional type of material such as a metal, e.g. aluminum or the like. However, it has been found that the manufacture of at least the vane assembly 330 from a thermoplastic material is advantageous because it allows the vanes 350 to be molded into the desired complex shape at a reasonable cost. Similarly, the complex shape of the base 440 can be molded at a reasonable cost.

It is evident from FIG. 3 that reinforcing ribs 482 extend between the central shaft 338 and the dome top surface 334. These stiffens the vane assembly 330. A set of spaced ribs 482 are preferably provided.

Figure 8:
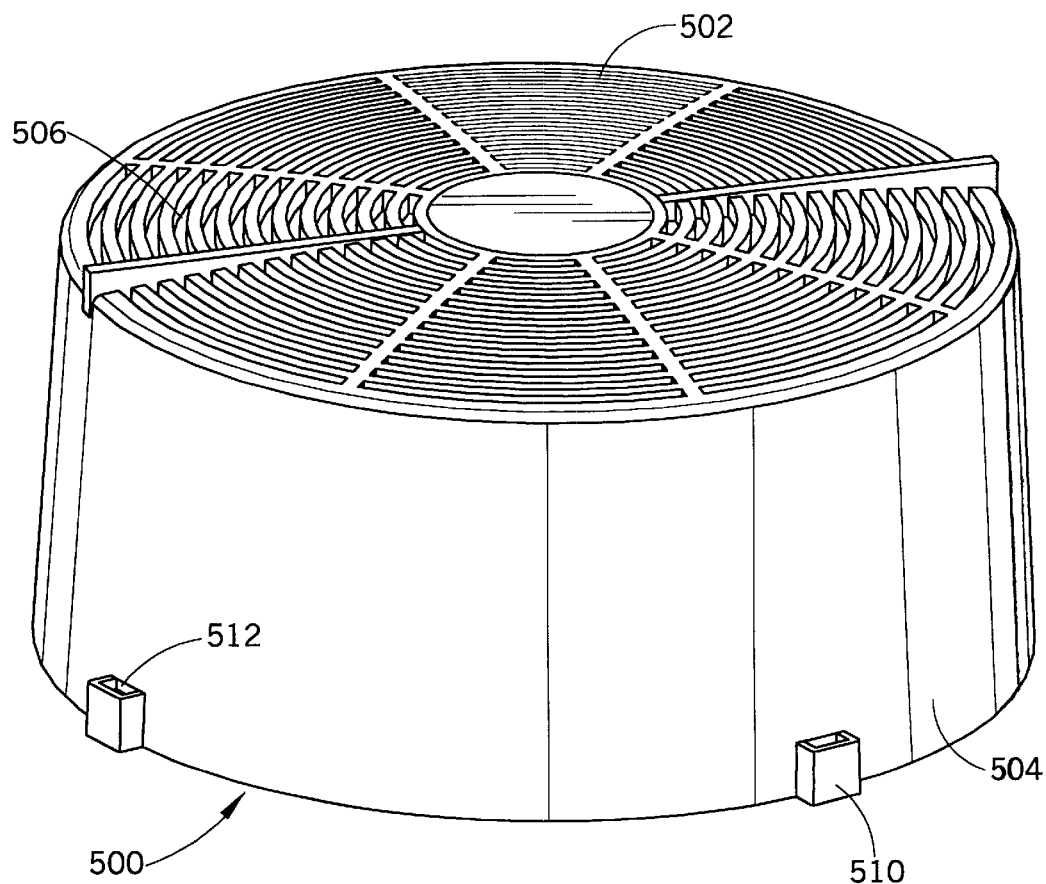
FIG. 8 is a perspective view of a cover for an air pre-cleaner according to a second preferred embodiment of the present invention.

With reference now to FIG. 8, illustrated there is another type of hood 500 used for an air pre-cleaner according to a second preferred embodiment of the present invention. In this embodiment, like components are identified by like numerals with a primed (') suffix and new components are identified by new numerals. The hood 500 comprises a top wall 502 and a side wall 504. A plurality of spaced openings 506 extend through the top wall 502. It should be apparent from FIG. 8 that the top wall 502 does not overhang the side wall 504. Also extending radially outwardly from the side wall 504 are a plurality of protrusions 510. Extending each protrusion is an opening 512.

Figure 9:
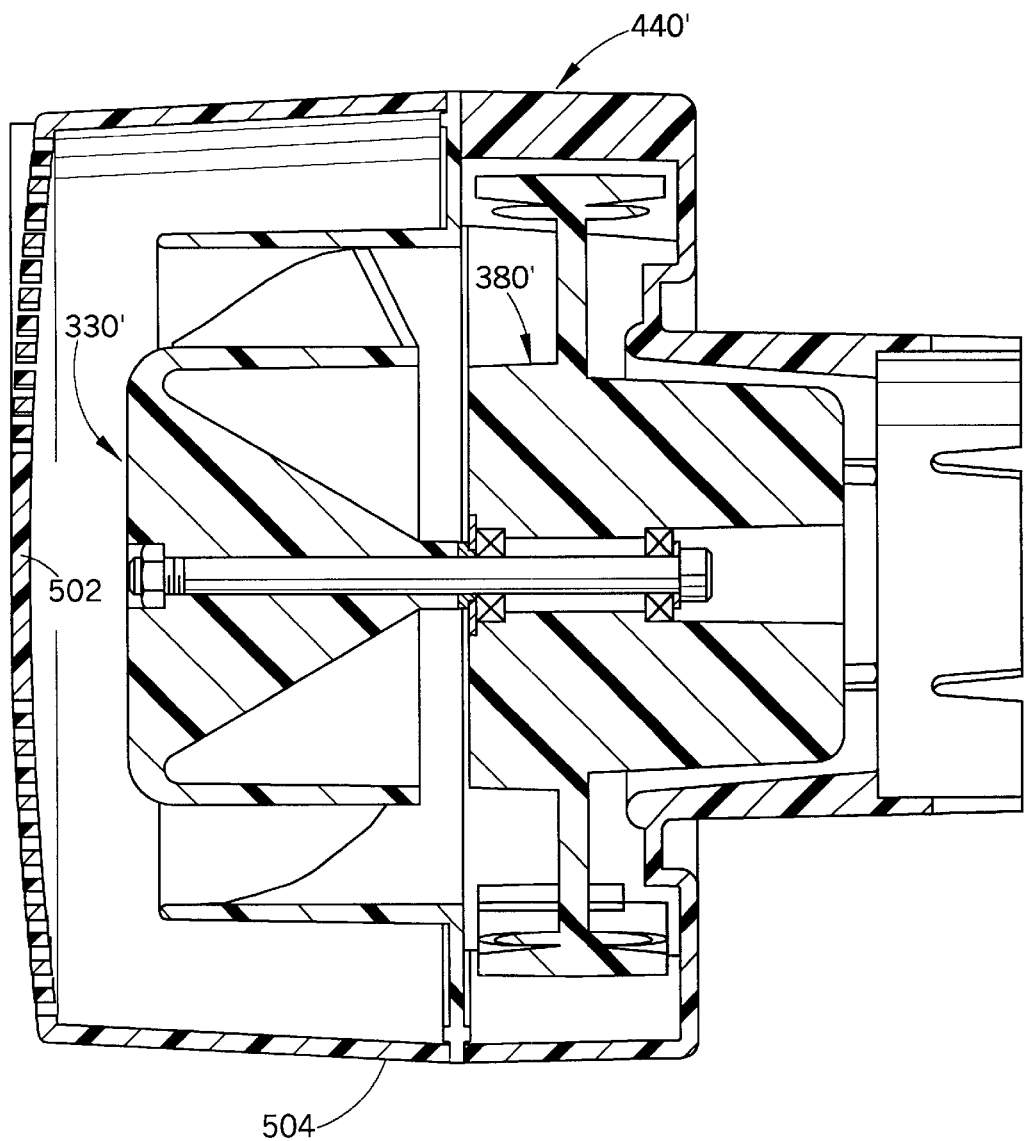
FIG. 9 is a cross-sectional view of the air pre-cleaner according to the present invention employing the cover of FIG. 8.

As shown in FIG. 9, the air pre-cleaner according to the second preferred embodiment of the present invention also includes a vane assembly 330', a rotating impeller assembly 380' and a base 440' as in the first embodiment.

As is illustrated in FIG. 9, the hood top wall 502 and the side wall 504 form a first chamber 520 for allowing inlet air into the air pre-cleaner. The air pre-cleaner of the second preferred embodiment illustrated in FIG. 9 is meant to be accommodated on an intake stack which is substantially horizontally oriented. In contrast, the hood 310 illustrated in FIGS. 1–7 is meant to be accommodated on an intake stack which is substantially vertically oriented. In this way, rain is not ingested in great quantities in the intake stack. Rather, the openings 506 in the hood 500 are horizontally oriented as are the openings 318 in the hood 310.

Any dirt which may become trapped between an outer wall of the vane assembly 330' and the inner side of the side wall 504 will simply fall by gravity to the lowest point of the first chamber and flow out through the lowest aperture 506 and back into the atmosphere when the dirt reaches the level of the lowest aperture.

The invention has been described with reference to preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

What is claimed is:

1. An air pre-cleaner that separates particulates from air comprising:

a hood having at least one opening through which air enters the pre-cleaner;

a vane assembly including a centrally positioned dome, a collar encircling said dome and a plurality of vanes each vane being connected at an inner end to said dome and at an outer end to said collar, each vane being angled in relation to a horizontal plane, and wherein a pitch of at least one vane of said plurality of vanes is twisted along its length to keep a chord width of the at least one vane relatively constant over the length thereof;

a rotating impeller assembly rotatably mounted to said vane assembly; and a base to which said vane assembly and said hood are secured wherein said base includes at least one clean air outlet opening through which air exits the pre-cleaner and at least one dirty air outlet port through which particulates entrained in air exit the pre-cleaner.

2. The air pre-cleaner of claim 1 wherein said hood comprises a plurality of spaced aligned openings through which air enters the pre-cleaner.

3. The air pre-cleaner of claim 1 wherein said base comprises:

a side wall;

a base wall secured on a first face thereof to said side wall and extending substantially radially inward from said side wall, said clean air outlet opening being defined in said base wall; and, a sleeve secured to a second face of said base wall and encircling said clean air outlet opening.

4. The air pre-cleaner of claim 3 wherein said at least one dirty air outlet port is defined in at least one of said side wall and said base wall.

5. An air pre-cleaner that separates particulates from air comprising:

a hood having at least one opening through which air enters the pre-cleaner;

a vane assembly including a centrally positioned dome, a collar encircling said dome and a plurality of vanes each vane being connected at an inner end to said dome and at an outer end to said collar, each vane being angled in relation to a horizontal plane, a rotating impeller assembly rotatably mounted to said vane assembly;

a base to which said vane assembly and said hood are secured wherein said base includes at least one clean air outlet port through which air exits the pre-cleaner and at least one dirty air outlet port through which particulates entrained in air exit the pre-cleaner; and, a stator vane secured to said base adjacent the said clean air outlet port.

6. The air pre-cleaner of claim 1 wherein said rotating impeller comprises:

a hub;

at least one arm secured to and extending radially outward from said hub;

a first blade mounted at a distal end of said at least one arm; and, a second blade mounted at a proximal end of said at least one arm.

7. The air pre-cleaner of claim 6 wherein said first blade comprises a first section and a second section, wherein said second section extends at an obtuse angle in relation to said first section.

8. An air pre-cleaner for centrifugally ejecting heavier than air particulates from an air stream for use in an engine having an air intake, comprising:

a hood having an opening through which air enters the pre-cleaner;

a vane assembly including centrally positioned dome, a collar encircling said dome and a plurality of vanes, each vane being connected at a radially inner edge to said dome and at a radially outer edge to said collar, each vane being angled in relation to a horizontal plane;

a rotating impeller assembly rotatably mounted to said vane assembly; and, a base on which said vane assembly and said hood are supported, wherein said hood, said vane assembly and said base are secured to each other, wherein said base comprises:

a clean air outlet port located in said base, a dirty air outlet port located in said base, and, a stator vane mounted on said base, said stator vane being located adjacent said clean air outlet port, said stator vane extending parallel to an axis of said outlet port.

9. The air pre-cleaner of claim 8 wherein said hood comprises a plurality of spaced aligned inlet openings through which air can enter.

10. The air pre-cleaner of claim 8 wherein said base further comprises a thickened toroidal wall section encircling said clean air outlet port.

11. The air pre-cleaner of claim 8 wherein a plurality of spaced stator vanes are located on a sleeve of said base, said sleeve encircling said outlet port.

12. The air pre-cleaner of claim 8 wherein said rotating impeller assembly comprises a hub;

at least one arm extending radially outwardly from said hub; and, a blade mounted on a distal end of said at least one arm.

13. The air pre-cleaner of claim 12 wherein said blade comprises a first section which extends approximately parallel to said arm and a second section which extends at an acute angle in relation to said arm.

14. The air pre-cleaner of claim 13 wherein said first section of said blade is larger in area than is said second section of said blade.

15. An apparatus for separating particles from a gas carrying the particles, comprising:

a housing including a separation chamber, said housing having an inside wall surface surrounding said chamber, said housing comprising:

an inlet opening through which air enters the pre-cleaner, a vane assembly including a plurality of inlet vanes, a dirty air exhaust port through which air entrained dirt and dust particles exit said housing, and a clean air exhaust port; and, an impeller assembly rotatably mounted in said separation chamber and wherein at least one of said plurality of inlet vanes comprises a first portion and a second portion wherein said second portion is canted in relation to said first portion and is wider at a bottom end thereof than at a top end thereof.

16. The air pre-cleaner of claim 15 wherein said impeller assembly comprises:

a hub, at least one arm extending radially outwardly from said hub, and a first blade mounted at a distal end of said at least one arm, said first blade comprising a first section which extends along an axis approximately parallel to said arm and a second section which extends at an acute angle to said axis.

17. The apparatus of claim 16 wherein said impeller assembly further comprises a second blade mounted at a proximal end of said at least one arm.

18. The apparatus of claim 17 wherein said impeller assembly further comprises four arms, each including a first blade and a second blade, said arms being spaced from each other so as to have a cruciform shape.

19. The apparatus of claim 15 further comprising a fastener for securing said impeller assembly to said housing and a bearing positioned between said impeller assembly and said housing for enabling rotation of said impeller assembly in relation to said housing.

20. An apparatus for separating particles from a gas carrying the particles, comprising:

a housing including a separation chamber, said housing having an inside wall surface surrounding said chamber, said housing comprising:

an inlet opening through which air enters the pre-cleaner, a vane assembly including a plurality of inlet vanes, a dirty air exhaust port through which air entrained dirt and dust particles exit said housing, and a clean air exhaust port; and, an impeller assembly rotatably mounted in said separation chamber; and, a stator vane positioned adjacent said dirty air exhaust port.

21. The apparatus of claim 15 wherein a pitch of each inlet vane of said vane assembly is twisted to keep a chord width of each inlet vane relatively constant over the full vane length.

22. The apparatus of claim 15 wherein a vane chord of each inlet vane of said vane assembly is slightly wider at an inner diameter than at an outer diameter of that inlet vane.

* * * * *